(12) United States Patent
Davis et al.

(10) Patent No.: US 6,604,030 B1
(45) Date of Patent: Aug. 5, 2003

(54) SINGLE FAULT IMPERVIOUS INTEGRATED CONTROL AND MONITORING SYSTEM

(75) Inventors: Larry Davis, Riverside, CA (US); Dean Munson, Pomona, CA (US)

(73) Assignee: Ozuna Holdings Incorporated, Upland, CA (US)

( * ) Notice: Subject to any disclaimer, the term of this patent is extended or adjusted under 35 U.S.C. 154(b) by 375 days.

(21) Appl. No.: 09/589,040

(22) Filed: Jun. 6, 2000

(51) Int. Cl.⁷ .......................... G06F 7/00; G06F 17/00; G05D 1/00; G05D 3/00

(52) U.S. Cl. .............................. 701/9; 701/10; 701/11; 701/14; 701/35; 701/224; 701/120; 244/3.15; 244/163; 244/75 R; 244/76 R; 340/989

(58) Field of Search .................. 714/1, 4; 709/201, 709/217, 224, 249, 237–239; 711/114; 379/2; 370/228; 244/3.15, 182, 159–160, 163, 35–39, 75 R, 76 R, 194–195; 701/123, 121, 204–207, 122, 224, 225, 9–14; 340/945

(56) References Cited

U.S. PATENT DOCUMENTS 3,706,969 A * 12/1972 Paredes ...................... 340/989
4,845,629 A * 7/1989 Murga ........................ 701/120
5,019,980 A * 5/1991 Starr et al. ..................... 701/35
5,121,325 A * 6/1992 DeJonge ..................... 701/123
5,448,723 A * 9/1995 Rowett ....................... 709/249
6,088,330 A * 7/2000 Bruck et al. ................ 370/228
6,112,249 A * 8/2000 Bader et al. .................... 330/3

* cited by examiner

Primary Examiner—Ramesh Patel
(74) Attorney, Agent, or Firm—Stout, Uxa, Buyan & Mullins, LLP; Frank J. Uxa; Greg S. Hollrigel

(57) ABSTRACT

An integrated control and monitoring system for airport avionics is made single-point-of-failure impervious by continuously operating pairs of parallel-connected concentrators, Remote Master Workstations and Remote Slave Workstations, and a pair of independent LANs each connecting one of the concentrators of a pair to the Remote Workstations. Each concentrator of a concentrator pair, while in secondary status, monitors the operation of the concentrator in primary status, and whenever it observes a failure of communication will assume primary status and continue to allow ICMS to function in a normal manner. Likewise, another Remote Master Workstation automatically assumes Remote Master Workstation status if it fails to see an operational active master station on the network.

20 Claims, 5 Drawing Sheets

| | ILS_MK1F | ILS_MK10 | ILS_MK20 | PAPI | MALSR | ALSF | RVR | CAT |
|---|---|---|---|---|---|---|---|---|
| 07 | ALERT | NSA | NSA | NORMAL | NORMAL | NSA | NORMAL | 1 |
| 08 | ALERT | NSA | NSA | NSA | NSA | NSA | NORMAL | 1 |
| 16L | NORMAL | NSA | NSA | NORMAL | NORMAL | NSA | NORMAL | 1 |
| 17L | NORMAL | NSA | NSA | NSA | NSA | NSA | NORMAL | 1 |
| 17R | NORMAL | NSA | NSA | NORMAL | NORMAL | NSA | NORMAL | 1 |
| 25 | ALERT | NSA | NSA | NORMAL | NSA | NSA | NORMAL | 1 |
| 26 | ALERT | NSA | ALERT | NSA | NSA | NSA | NORMAL | 1 |
| 34R | NSA | NSA | NORMAL | NSA | NSA | NORMAL | NORMAL | 1 |
| 35L | NSA | NSA | NORMAL | NSA | NSA | NORMAL | NORMAL | 1 |
| 35R | NSA | NSA | NORMAL | NSA | NSA | NSA | NORMAL | |

Fig. 2

SINGLE FAULT IMPERVIOUS INTEGRATED CONTROL AND MONITORING SYSTEM

FIELD OF THE INVENTION

This invention relates to integrated control and monitoring systems for aircraft guidance and safety equipment at airports, and more particularly to an integrated system in which no single component or communications failure can adversely affect the functionality of the system.

BACKGROUND OF THE INVENTION

Airports contain a wide variety of equipment which air traffic control personnel use to aid in the process of launching and recovering aircraft in a safe and efficient manner. Each user interface to this equipment is unique, because there is no common manufacturer and because each equipment performs a different function. It may be as simple as a panel of push buttons with incandescent lamps or as complex as a rack of switches and LEDs. In addition, the interfaces are typically located in different places such as the tower cab, scattered equipment cabinets, or field locations. Such equipment and interfaces may include runway lights, instrument landing systems (ILS), emergency generators, and other systems that ensure safe management of the aircraft.

It has previously been proposed, in a first-generation system, to connect all of these various interfaces to a common high-speed network of workstations known as an Integrated Control and Monitor System (ICMS) manufactured by the assignee of this application. The advantage of ICMS is that it allows all the interfaces to be displayed to a controller at a common location a in a graphical user interface (GUI) format that has a common "look and feel". It also allows the controller to selectively control and monitor all the equipment from one or more locations. The ICMS further allows the provision of computer controlled interlocks to prevent human error. For example, each physical runway at an airport represents two virtual runways, one handling traffic in one direction, the other handling traffic in the opposite direction. Each of these virtual runways has its own set of equipment. It is therefore imperative that when the traffic direction on a physical runway is changed, ICMS refuses to turn on the equipment for the new virtual runway until the equipment (for example the localizer and the glide slope transmitters) of the previous virtual runway has shut down.

The first-generation ICMS was well accepted, but it had the drawback that certain component failures within ICMS could adversely affect the monitoring and control of not just one piece of equipment, but all of them simultaneously. It therefore became desirable to provide a second generation ICMS with no single point of failure, that is, a system such that no one component of the ICMS could fail and result in a complete ICMS failure.

SUMMARY OF THE INVENTION

The present invention provides such a no-single-point-of-failure (NSPF) configuration of an ICMS by adding an identical redundant component to any component that represents a single point of interface to the remote equipment. ICMS is comprised of a group of computers linked together over a high speed Ethernet local area network (LAN) utilizing the Transport Control Protocol over Internet Protocol (TCP/IP) architecture. These computers are of two different types.

One type of computer is a commercially off the shelf (COTS) IBM compatible computer which is classified as an ICMS Remote Workstation. The ICMS Remote Workstation provides a user interface to ICMS monitored equipment for the air traffic controller. There can be as many ICMS Remote Workstations as needed based on the number of user interfaces required. An ICMS Remote Workstation may be classified as either a Remote Master Workstation or Remote Slave Workstation. There may be only one Remote Master Workstation at any given time. The non Remote Master Workstations are classified as Remote Slave Workstations.

The other type of computer is also COTS industrial grade computer and is classified as an ICMS concentrator. Redundant pairs of concentrators share a common interface to the remote equipment. Each concentrator is connected to the Remote Workstations on its own LAN. The redundant pair of concentrators are connected to each other through a digital interface which is used to provide status signals to each other. One concentrator is active or primary at any given time. This means that it is providing the interface between the Remote Master Workstation and the remote equipment. The standby or secondary concentrator monitors the status of the remote equipment and the control status of the primary concentrator. If the primary concentrator experiences a communication failure with the Remote Master Workstation, it will relinquish its primary concentrator status to the secondary concentrator and allow operational status and control between the Remote Master Workstation and the remote equipment to continue without interruption. Once the failed concentrator reestablishes communications with the Remote Master Workstation, it becomes the inactive or secondary concentrator. This provides the concentrator with the ability to interface with the equipment in the case of the active primary concentrator, or in the case of the active secondary concentrator, the ability to monitor the status of the active primary concentrator interface and thus prevent the concentrator from representing a single point of failure for ICMS.

ICMS also provides another important feature of status and control archiving. Each of the concentrators maintains an archive file where it records all status changes received from, and controls sent to, the remote equipment. Each archive entry is time and date stamped which allows recreation of valuable remote equipment status changes and controller interaction with the remote equipment in the case of an accident.

BRIEF DESCRIPTION OF THE DRAWINGS

FIG. 2 depicts a typical display of the information generated by the system.

DESCRIPTION OF THE PREFERRED EMBODIMENT

Figure 1:
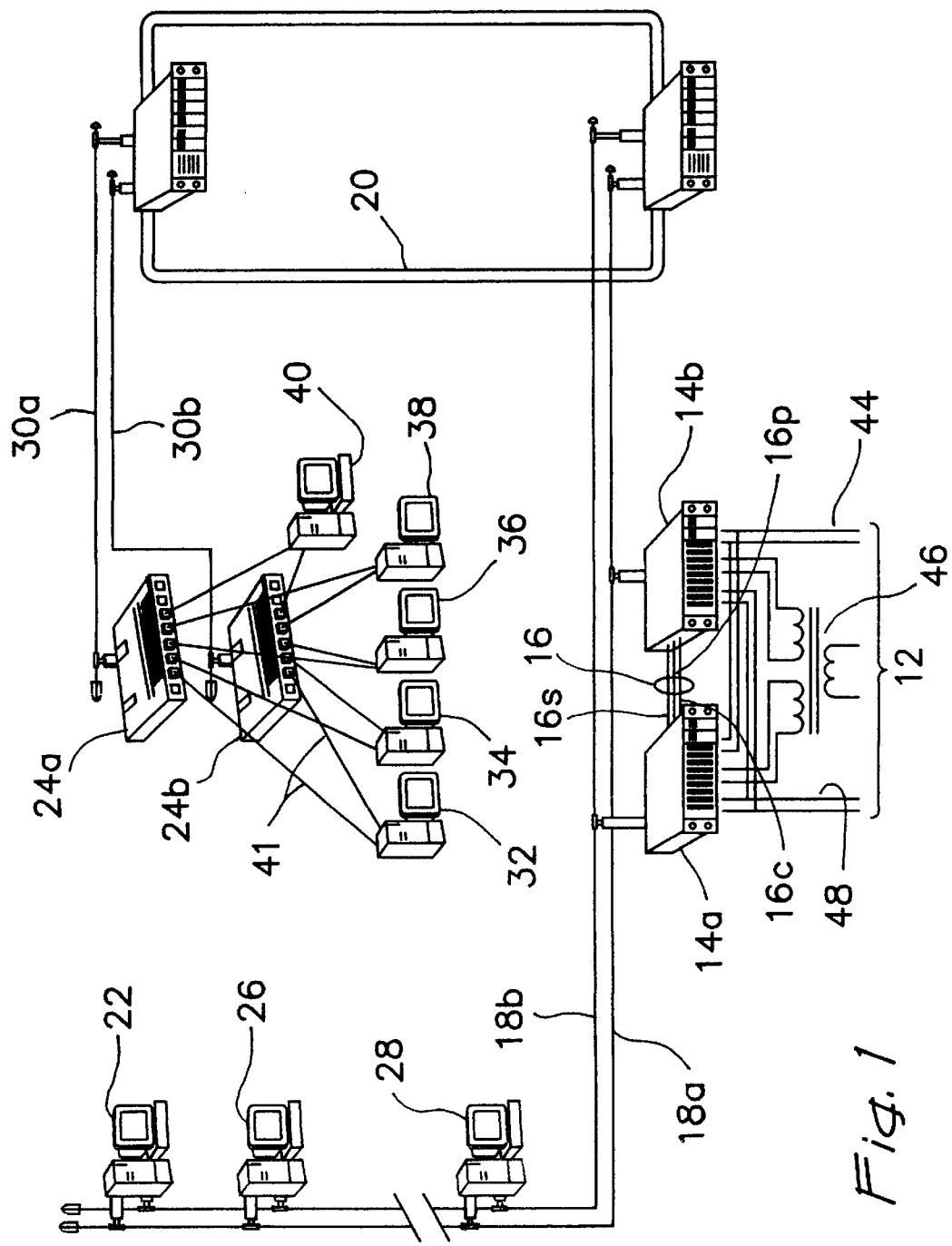
FIG. 1 is a diagram showing the interconnection of the system of the invention.

FIG. 1 illustrates the architecture of an NSPF ICMS according to the invention. In this configuration, a pair of IEEE 802.3, 10baseT hubs 24a and 24b are located in the Tower Cab, each of them feeding five Remote Workstations 32, 34, 36, 38, and 40. Use of 10baseT topology is done to improve the reliability. If one of the five 10baseT segments 41, in the Tower fails, it will not adversely effect the other four segments. The two hubs are connected over redundant 10base2 LANs 30a and 30b, to the facility fiber optic network 20, which provides an extension to another pair of redundant IEEE 802.3 LANs 18a and 18b, in the Tower base building. The LANs in the base building extend to the equipment room where the redundant pair of concentrators 14a and 14b are located and to a Remote Workstation 28. The LANs also extend to the Tower Radar Approach Control room (TRACON) and the Maintenance Control Center (MCC) where Remote Workstations 26 and 22 are located.

The concentrators 14a and 14b use part of the digital I/O 16 that they share, to establish status signals 16p between the concentrators to determine who is the primary concentrator, and status signals 16s to determine who is the secondary concentrator 16s. The secondary concentrator also uses another status line, 16c, to communicate to the primary concentrator the fact that it has established communication with the Remote Master Workstation. These status lines can be read or actively driven by either concentrator.

When concentrator 14a or 14b is in primary status it is fully functional on both its inputs and its outputs, i.e. it receives information from the interfaces 12 and transmits that information over the LAN at regular intervals (e.g. once per second) to the currently Remote Master Workstation, 40. Conversely, the primary concentrator receives commands from the Remote Master Workstation over the LAN and transmits them in the appropriate format to the remote equipment through the interfaces 12.

When a concentrator 14a or 14b is in secondary status, it continues to monitor the interfaces between the active primary concentrator and the remote equipment. It places its common outputs into a passive state to prevent conflicts with the primary concentrator's common outputs. The secondary concentrator continues to search for the Remote Master Workstation so that it may be ready to connect in the case of a failure on the active primary concentrator.

Each ICMS workstation 22 through 40 contains a file which is located in C:\WINNT\SYSTEM32\DRIVERS\ETC\HOSTS where all of the workstations of the ICMS are defined by (1) IP address, (2) workstation name, and (3) workstation alias name. This file, which is created and statically maintained by the ICMS System Administrator, is used by the workstation to resolve IP addresses from workstation alias names. There may be five Remote Workstations defined as potential Remote Master Workstations. There can be only one Remote Master Workstation at any given time. These five workstations have alias names defined in the HOSTS file as "Remote-Master-1" (highest priority) through "Remote-Master-5" (lowest priority). Although the names of the remote workstations vary from one ICMS installation to another, the alias names remain the same. In this manner, ICMS can access this file to determine which workstation is the next potential Remote Master by its alias. In the case that a Remote Master Workstation fails or is shut down, the next highest priority workstation in the HOSTS file will assume Remote Master status and begin listening for TCP connections on the redundant LANs 18a, 18b and 30a, 30b.

The ICMS concentrators 14a and 14b also contain an identical copy of this file located in C:\PCTCP\ETC\HOSTS. When the Remote Master Workstation relinquishes its Master status, the ICMS concentrators 14a and 14b see this as a network communication failure and through the use of the "HOSTS" file, initiate a search for the new Remote Master Workstation.

The other Remote Slave Workstations sense the loss of the Remote Master Workstation and begin to search for the new Remote Master Workstation in the same manner as the concentrators. To save time, the search is performed using User Datagram Protocol (UDP). Using the alias names, "Remote-Master-1" through "Remote-Master-5" as defined in the HOSTS file, query packets can be sent out without the protocol overhead involved with a TCP connection. These query packets continue at regular intervals (1 per 250 milliseconds), rotating through the alias list until the Remote Slave Workstations and the concentrators receive a UDP query response defining which workstation is the Remote Master Workstation. This response may be sent by another Remote Slave Workstation as well as the Remote Master Workstation. Upon receiving this response, the Remote Slave Workstations and the concentrators will establish TCP connections with the Remote Master Workstation.

Only a concentrator which has primary status will attempt to make a TCP connection to the Remote Master Workstation. The secondary concentrators will continue to send the query UDP packets out to monitor the availability of the Remote Master Workstation. These UDP queries are sent at a slower rate, (1 per second), to minimize the impact on the bandwidth of the network. As long as it continues to receive response UDP packets defining who the Remote Master Workstation is, the secondary concentrator will maintain active status signals to the primary concentrator indicating that it is ready to assume primary concentrator status in the case that the active primary concentrator fails or is taken off line by a technician.

Figure 3A:
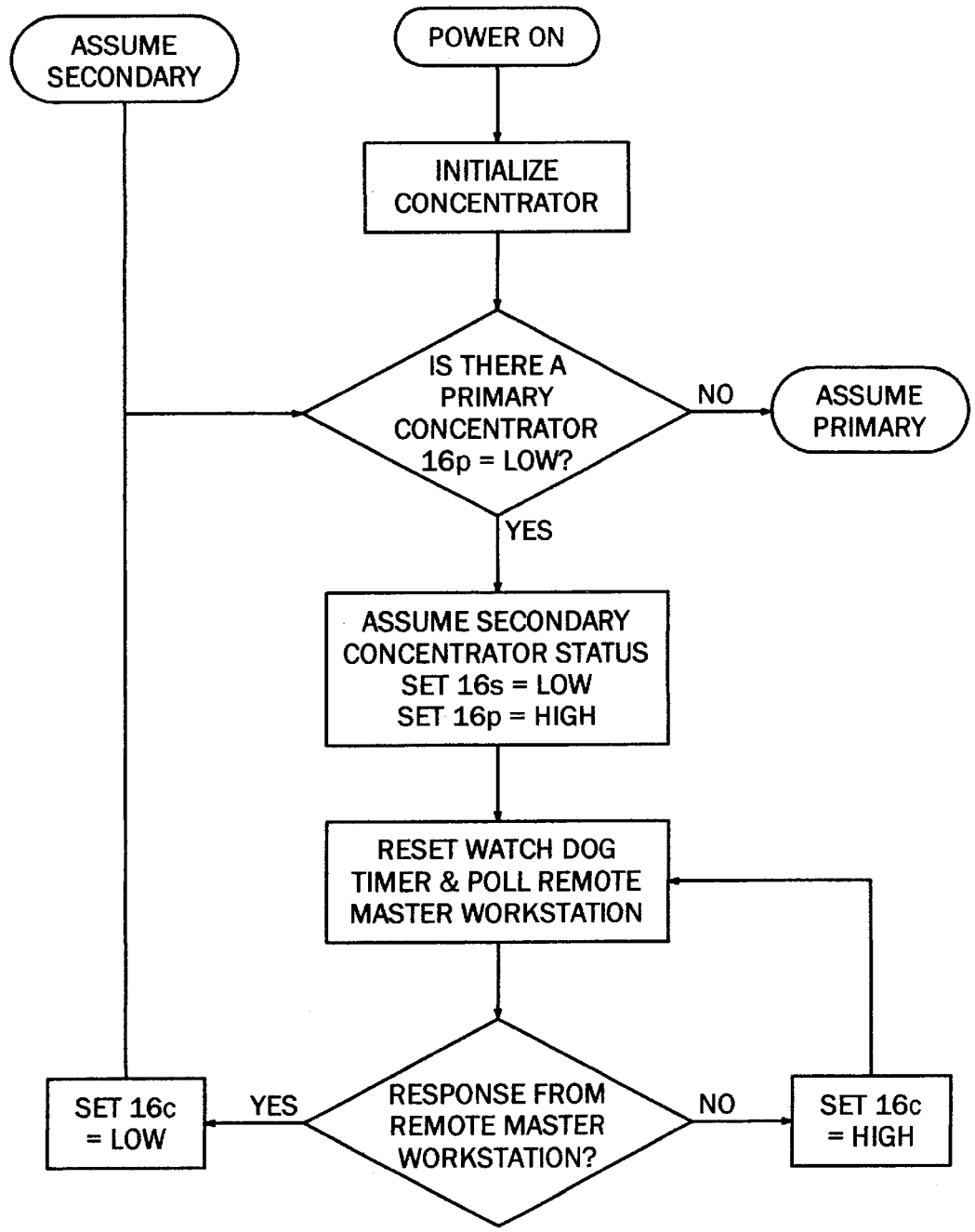
FIGS. 3a, 3b and 3c are flow chart illustrating the response of the concentrators to a fault condition.
Figure 3B:
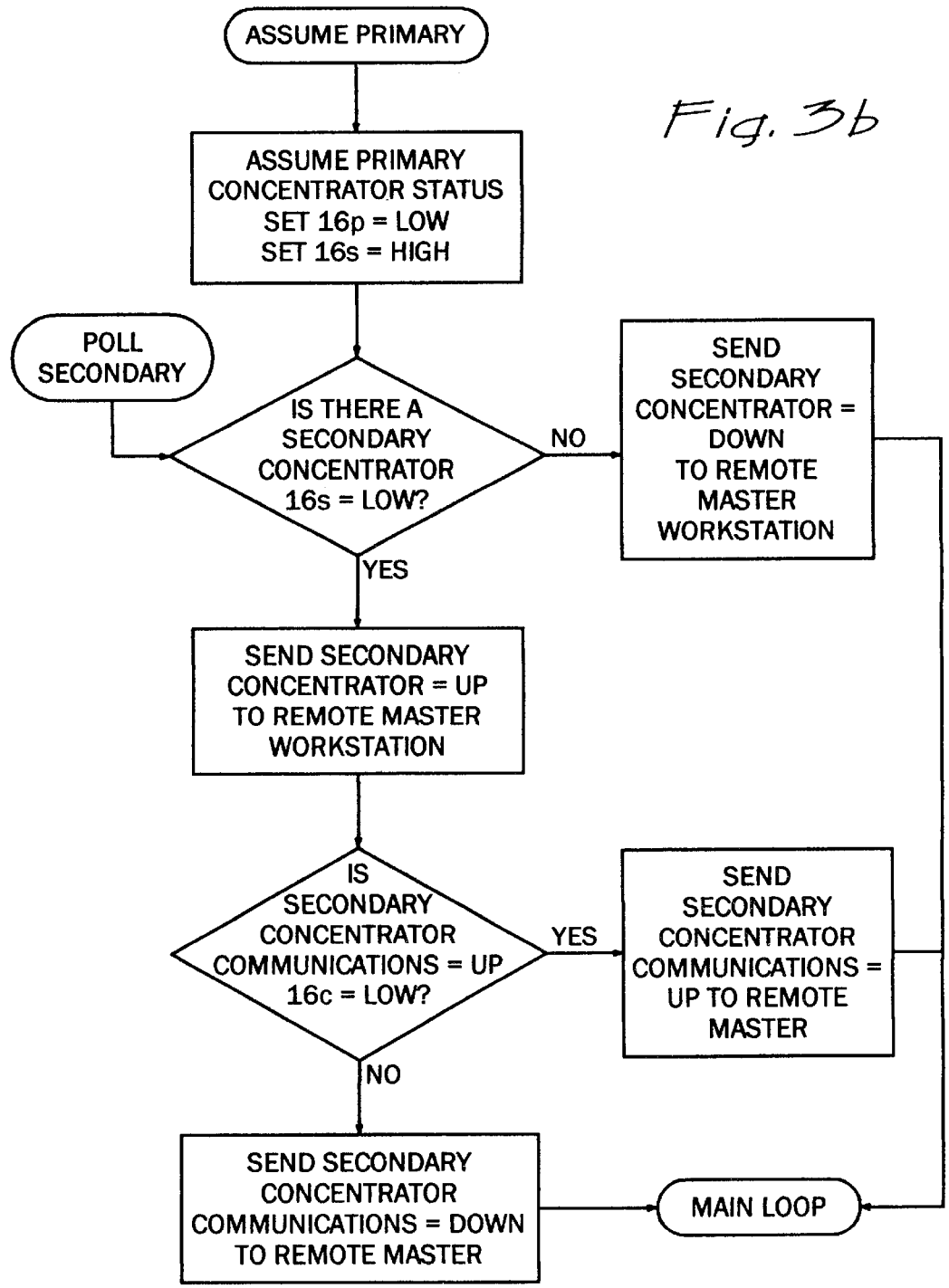
Figure 3C:
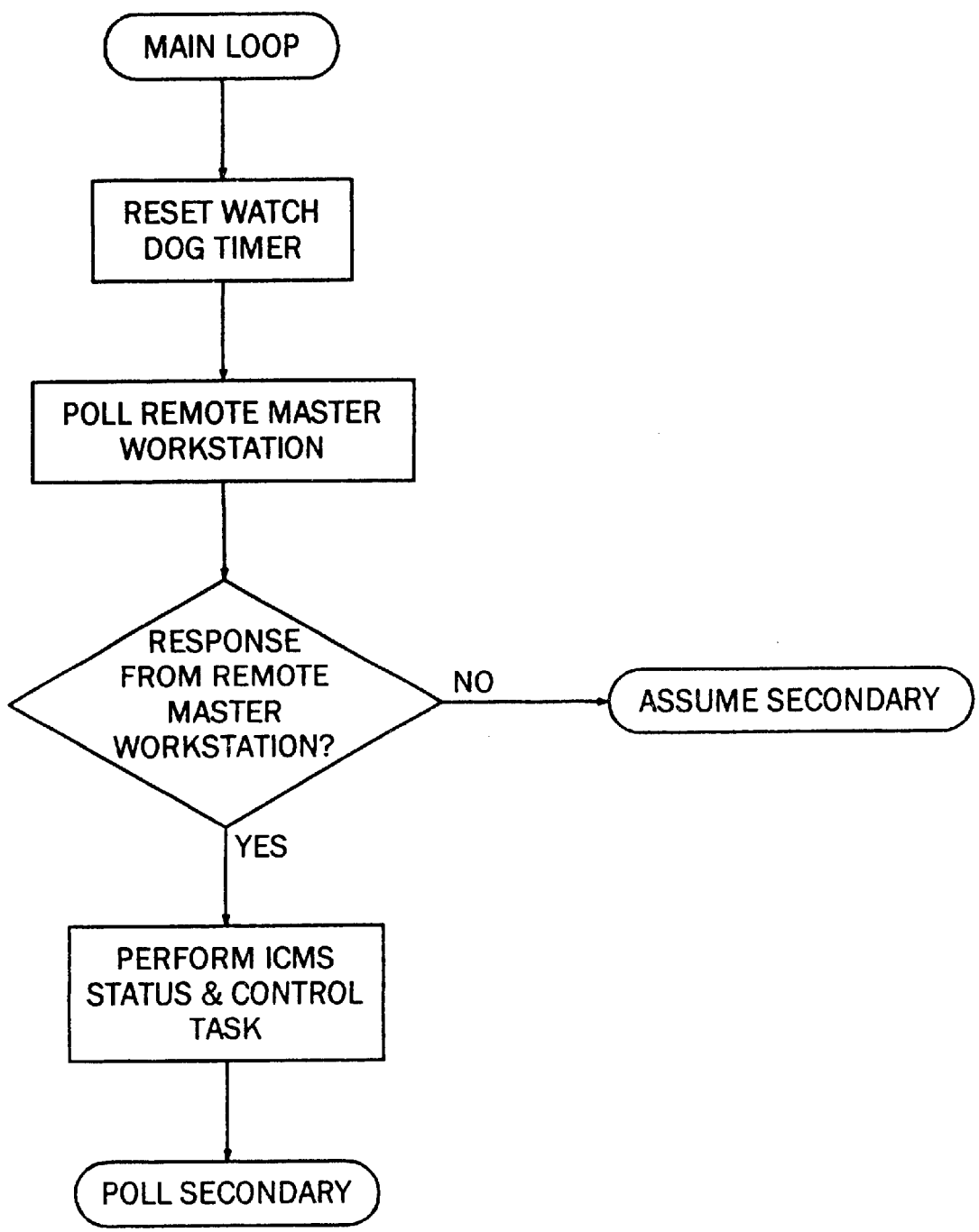

As shown in FIGS. 3a–c, when a concentrator is powered on it will check status line 16p for an active low level signal, indicating that the other concentrator has assumed primary status. If this line is at an active low level it will assert a active low signal on status line 16s, indicating that it has assumed active secondary concentrator status. When it determines who the Remote Master Workstation is, it will assert an active low level on line 16c indicating that it is ready to assume primary concentrator status in the case there is a failure with the current active primary concentrator.

However, at power on, if line 16p is at an inactive high level indicating that there is no current active primary concentrator, one of the concentrators will assert an active low level on line 16p indicating it has assumed active primary concentrator status. It will then look at line 16s and line 16c for active low signals indicating that there is a secondary concentrator with good communications with the Remote Master Workstation. If either of these lines are in an inactive high state, the primary concentrator will report to the Remote Master Workstation that the secondary concentrator is down. When both of these lines 16s and 16c assume an active low level, the primary concentrator will report to the Remote Master Workstation that the secondary LAN is up and that the secondary concentrator is up and ready to assume primary status in the case of a failure in the current active primary concentrator.

In case there is a failure in the active primary concentrator's ability to communicate with the active Remoter Master Workstation, assuming that the secondary concentrator is up and ready to take over, the primary concentrator will remove the active low level placed on 16p and assert an active low level on status line 16s, indicating that it is assuming secondary concentrator status. It will then wait for the secondary concentrator to assert a active low level on 16p, indicating that the current secondary concentrator has assumed primary concentrator status. In case there is no secondary concentrator at the time of the failure, or the secondary concentrator does not have communications with the Remote Master Workstation, the primary concentrator will continue to maintain primary status until the failure is remedied and communication reestablished, or a secondary concentrator becomes available with communication with the Remote Master Workstation.

Each of the concentrators contains a configuration file, "C:\ICMS\ICMS.CFG", which is read from the hard disk drive when the concentrator is powered on, or does a reset. This file, which is created by the ICMS System Administrator, contains two types of information. This information is called facility records and STD Bus records. A facility record defines the facility identification, such as (1) DIA for Denver International Airport, (2) the active runway identification, such as 34L, (3) the identification of the inactive primary interlocked runway, such as 16R, (4) the inactive secondary interlocked runway, if any, and (5) the maximum category rating for this runway. It also contains (6) a list of equipment that this runway has associated with ICMS. The STD Bus records provide the details about the I/O cards installed in the concentrator, i.e. (1) the type of I/O card, (2) the I/O card's STD Bus address, and (3) the equipment it is interface to. These records allow ICMS to adapt to the facility that it is associated with. It also allows one common package of ICMS software to be used for all ICMS installed facilities.

When a primary concentrator establishes a TCP connection to the Remote Master Workstation, it sends copies of all of the facility records that were defined in its configuration file. This informs the Remote Master Workstation of the facility runways details and equipment associated with them, as defined by that concentrator. It also ensures that both the concentrator and the Remote Master Workstation have the same information about the facility. The Remote Master Workstation will send copies of these same facility records to the Remote Slave Workstations.

After receiving the facility records, the active Remote Master will send a command to the concentrator to set the time and date. This ensures that the concentrator is synchronized with the active Remote Workstation which receives its time from the facility time standard.

The active Remote Master will then send the concentrator a command to turn on the equipment status update. The concentrator will then start polling the facility equipment for status as defined in the configuration file. It will send this information in TCP packets to the Remote Master Workstation at regular intervals (1 per second). The Remote Master Workstation will then disseminate this same information in TCP packets to all of the Remote Slave Workstations. Any additional commands sent to the primary concentrator are initiated by the air traffic controller from the Remote Workstation GUI. These commands are used to turn equipment on or off or change equipment operational parameters. The Remote Master Workstation is the only Remote Workstation where a user may originate any control commands for the ILS equipment. This ensures that there is one point of responsibility for the life-critical ILS equipment. Commands to turn the lighting aids equipment such as ALSF, MALSR, and PAPI may originate from any Remote Workstation. In case the command originates from a Remote Slave Workstation, the command is sent to the Remote Master Workstation first after which it is forwarded to the appropriate concentrator. This allows the Remote Master Workstation the capability of selectively allowing only authorized Remote Slave Workstations to have control capabilities.

Since the concentrator is the focal point for all equipment status and equipment commands, an archive capability is maintained in the concentrator. Every command sent to the equipment and all status changes received from the equipment as well as any error conditions encountered in the concentrator are logged into an archive file with a time and date stamp. A separate archive file is maintained for each day. Each day at midnight, each concentrator will close the archive file for that day and send a copy of it to the NT Server Remote Workstation using File Transport Protocol (FTP). The concentrator will maintain a copy of that file on its hard disk drive also. An archive file for the new day will be created and the archiving process will continue.

Most of the time the concentrator is just sending equipment status packets to the Remote Master Workstation. Unless the concentrator receives a command from the Remote Master Workstation, it has no indication the Remote Master Workstation is present. To solve this problem the primary concentrator sends a TCP "Heartbeat" query to the Remote Master Workstation. If the Remote Master Workstation fails to respond to the query, the primary concentrator will close the TCP connection and relinquish primary concentrator status to the secondary concentrator, assuming it has contact with the Remote Master Workstation. If there is no secondary concentrator, or it does not have communication with the Remote Master Workstation, the primary concentrator will continue to search for a new Remote Master Workstation.

The concentrator pair 14a, 14b also contain a "Watch Dog Timer" which will perform a hard reset on the concentrator in the event that the concentrator fails to respond to its ICMS related task. Upon initialization, the concentrator will launch the ICMS application and resume its ICMS related task. If the primary concentrator is reset by the "Watch Dog Timer", the secondary concentrator will assume primary status and continue ICMS operation without affecting the remote equipment or the air traffic controller's user interface on the Remote Workstations.

The concentrator pairs are connected to the remote equipment in a parallel fashion shown at 12 in FIG. 1. In a preferred embodiment, there are currently (1) RS 232C serial interfaces, (2) RS 485 serial interfaces, (3) digital I/O, (4) static tone interfaces, and (5) frequency-shift-keying (FSK) interfaces used to communicate with the remote equipment. RS 232C is used to interface with the Mark 20 ILS. RS 485 is used to interface to the RVR equipment. Digital I/O is used to interface to MALSRs, PAPIs and Mark 20 ILS equipment. FSK is used to interface with the ALSF's, and static tones are used to interface with the Mark 1 ILS and DME equipment.

The Remote Workstation displays the status information in a GUI format. The general status for the entire facility is displayed in a Summary Screen in the form of a simple x-y matrix (see FIG. 2). The equipment columns are displayed across the x-axis and the runway identification is displayed down the y-axis. The general status information is highlighted with colors for the convenience of the user. Blue background indicates that the equipment is in a NORMAL state and is turned off, in the case of lighting aids equipment, or is interlocked off in the case of ILS equipment. Green background color indicates that the equipment is in a NORMAL state and turned on, in the case of lighting aids equipment, or in the case of ILS equipment, is interlocked on. Light blue or light green indicate that the equipment is in some state of degradation, i.e. it may be in CAT 1 condition when it has a maximum rating of CAT 3. A background color of red is used to indicate an alarm condition for equipment. Once the alarm condition is acknowledged the background color becomes orange. Using these color schemes, an air traffic controller may determine the overall status for the complete facility with a casual glance at the Summary Screen. Detailed status for a particular equipment may be obtained by clicking the mouse on the x-y cell associated with that equipment status. This will generate another window containing the detailed status information about that equipment along with any buttons for controls associated with that equipment. In the advent that an equipment exhibits an alarm condition, this will be brought to the air traffic controller's attention by the x-y status cell for the equipment changing to red background color, accompanied with an audible klaxon sound from the workstation. Once the air traffic controller has determined the source of the alarm for that equipment by bringing up the equipment GUI window, he may acknowledge the alarm by clicking the acknowledge button on the equipment GUI window. This will change the background color on the Summary Screen for that equipment x-y status cell to orange. It will also silence the audible alarm on that workstation. The use of this red-orange color scheme allows the user to differentiate between new and previously acknowledged equipment alarm conditions.

We claim:

1. A single-fault-impervious integrated control and monitoring avionic system, comprising:
   a. a pair of concentrators interchangeably capable of assuming primary and secondary status, respectively;
   b. a plurality of workstations, one of said workstations being a Remote Master Workstation; and
   c. a pair of independent communication paths each interconnecting one of said pair of concentrators with said workstations;
   d. each of said pair of concentrators being connected in parallel to a plurality of avionic equipment interfaces arranged to convey avionic equipment data to said concentrators and to convey operational commands from said concentrator to said avionic equipment;
   e. said pair of concentrators being so interconnected with each other that whenever one of them is in primary status, the outputs of the other are blocked but its inputs continue to function, each of said concentrators providing a status signal that is transmitted directly between said concentrators.

2. The system of claim 1, in which said primary concentrator, upon becoming unable to communicate with said Remote Master Workstation, causes said secondary concentrator to assume primary status if, and only if, said secondary concentrator is both operational and in communication with said Remote Master Workstation.

3. The system of claim 2, in which said primary and secondary concentrators are connected to each other by three bidirectionally assertable lines, the first of which is asserted by said primary concentrator when it is operating in primary mode, the second is asserted by said secondary concentrator when it is operating in secondary mode, and the third is asserted by said secondary concentrator when it is in communication with said Remote Master Workstation.

4. The system of claim 3, in which said primary concentrator, upon becoming unable to communicate with said Remote Master Workstation, while said second and third lines are asserted, releases said first line; said secondary concentrator releases said second and third lines in response thereto, and asserts said first line by assuming primary status; and said primary concentrator then asserts said second line by assuming secondary status.

5. The system of claim 4, in which said primary concentrator, upon becoming unable to communicate with said Remote Master Workstation while said second and/or third line is released, remains in primary status and searches for a Remote Master Workstation until communication with that Remote Master Workstation is restored.

6. The system of claim 1, in which a selected plurality of said workstations are Remote Master Workstations, and in which only one of said Remote Master Workstations at any given time has active Remote Master status, active status being automatically assumed by another one of said Remote Master Workstations if communication with the currently active Remote Master Workstation is interrupted.

7. The system of claim 1, in which said concentrators store in digital form for transmission to said workstations equipment data conveyed to them in digital format, frequency shift key format, serial data format or static composite tone format.

8. The system of claim 7, in which static composite tone formatted equipment data is conveyed in parallel to said pair of concentrators through a hybrid transformer.

9. A method of controlling and monitoring airport avionics systems, comprising:
   a) providing a primary concentrator assuming a primary status, and a secondary concentrator assuming a secondary status, each concentrator connected to each other, and connected in parallel to a first remote master workstation that controls and monitors aircraft guidance equipment and airport safety equipment so that only one of the concentrators assumes primary status at a given point in time;
   b) monitoring aircraft guidance equipment and airport safety equipment with the primary and secondary concentrators; and
   c) controlling the aircraft guidance equipment and airport safety equipment without interruption by causing the secondary concentrator to assume primary status when the primary concentrator experiences a failure.

10. The method of claim 9, wherein the monitoring step comprises monitoring the status of the primary concentrator with the secondary concentrator.

11. The method of claim 9, further comprising
    d) generating a status signal from the primary concentrator; and
    e) transmitting the status signal to the secondary concentrator.

12. The method of claim 11, wherein the transmitting step comprises transmitting the status signal from the primary concentrator directly to the secondary concentrator.

13. The method of claim 9, further comprising
    d) causing the primary concentrator to assume secondary status after the secondary concentrator assumes primary status.

14. The method of claim 9, further comprising
    d) archiving data regarding status changes received from the airport guidance equipment and airport safety equipment, and controls sent to the airport guidance equipment and airport safety equipment.

15. The method of claim 9, further comprising
    d) providing at least one additional computer workstation in communication with each of the concentrators, the at least one additional computer workstation assuming an active status and becoming a second remote master workstation if the first remote master workstation experiences a failure.

16. The method of claim 9, wherein the primary and secondary concentrators are connected to each other by three status lines, a first status line connecting the primary and secondary concentrators to transmit information to determine which concentrator has assumed primary status, a second status line connecting the primary and secondary concentrators to transmit information to determine which concentrator has assumed secondary status, and a third status line to transmit information to the primary concentrator to determine if the secondary concentrator is in communication with the remote master workstation.

17. The method of claim 9, wherein the secondary concentrator assumes primary status when the primary concentrator experiences a communication failure with the secondary concentrator or with the first remote master workstation.

18. The method of claim 9, wherein the concentrators and the first remote master workstation are provided in locations spaced apart from each other.

19. The method of claim 9, wherein each of the concentrators is configured to provide output signals to the aircraft guidance equipment and airport safety equipment, but only the concentrator that has assumed primary status transmits those output signals to the aircraft guidance equipment and airport safety equipment.

20. The method of claim 9, wherein each of the concentrators provides a signal to the first remote master workstation to monitor the availability of the first remote master workstation.

* * * * *